Oct. 4, 1960    J. F. BARNES ET AL    2,954,803
TUBULAR METALLIC FOIL PRODUCTS AND METHOD OF PRODUCING THEM
Filed Sept. 2, 1955
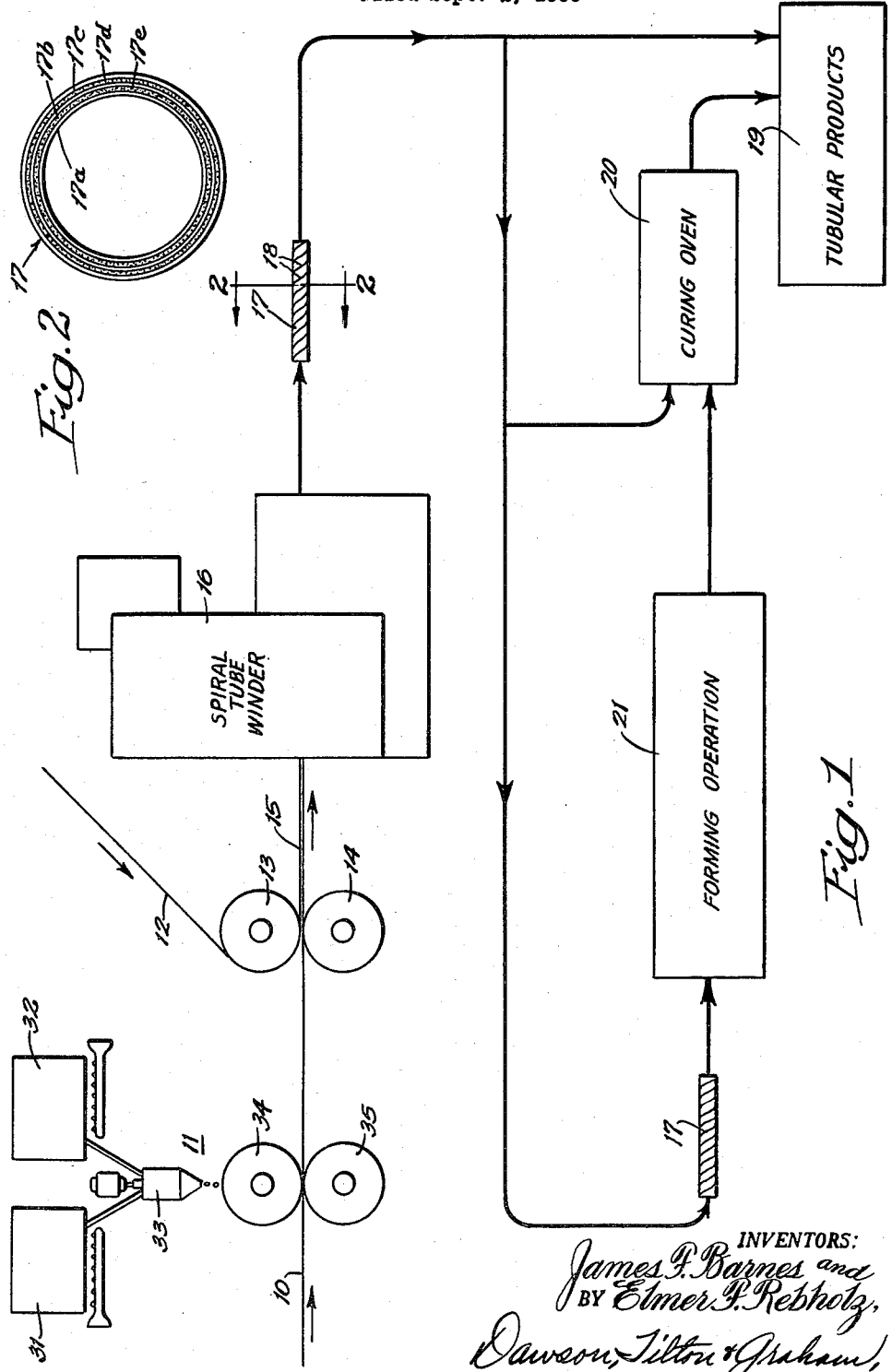
INVENTORS:
James F. Barnes and
BY Elmer F. Rebholz,
Dawson, Tilton & Graham,
ATTORNEYS.

United States Patent Office 2,954,803
Patented Oct. 4, 1960

2,954,803

TUBULAR METALLIC FOIL PRODUCTS AND METHOD OF PRODUCING THEM

James F. Barnes, Van Nuys, Calif., and Elmer F. Rebholz, St. Louis, Mo., assignors to Foil Process Corporation, Van Nuys, Calif., a corporation of California Filed Sept. 2, 1955, Ser. No. 532,189

2 Claims. (Cl. 138—62)

This invention relates to tubular metallic foil products and to a method of producing them. The invention has particular utility for the production of light-weight pipe from aluminum foil for conveying liquid or gaseous mediums. A specific illustration is portable irrigation pipe.

Tubular products, such as irrigation pipe, have heretofore been formed from aluminum, usually by an extrusion process. Sheet aluminum has also been formed into tubes for some purposes. Tubular aluminum products produced by either of these procedures are subject to certain limitations and disadvantages, which heretofore have not been satisfactorily overcome. For example, extruded aluminum piping for use in portable irrigation systems is not as light in weight as would be desirable. The pipe sections may be as long as 30 feet and the gauge of the aluminum must be sufficient to hold the water within the pipes under pressures of at least 40 to 60 pounds per square inch. The necessary compromise between undue weight with increased cost and handling difficulties and thinner gauges with increasing porosity has resulted in commercial pipe which sweats under pressure. This infiltration of liquid through the porosity of the pipe material is very conducive to corrosion. It would be desirable to provide an aluminum pipe which overcomes this problem of sweating without increasing the weight of the pipe sections. The aluminum walls of the pipe also tend to create a handling problem since the pipes are used in the open and exposed to the sun for long periods of time. The direct rays of the sun heat the pipe walls to temperatures which make the pipe uncomfortable to handle with the bare hands, particularly during periods when the pipes are exposed to the sun while they are not under pressure.

Portable irrigation pipe produced in accordance with this invention substantially overcomes the problems and difficulties discussed above. Pipe sections of the same length can be 40 to 60% lighter, while at the same time being more impervious to water than the present aluminum irrigation pipes. Consequently, the irrigation pipe of this invention sweats considerably less in use than the prior aluminum irrigation pipe. It is also much more convenient to handle, since, as already indicated, comparable lengths are much lighter. It is also more comfortable to handle after standing in the sun. Still another important advantage of the aluminum pipe of this invention is that the aluminum content of the pipe is considerably less, thus effecting a substantial saving in the per pound cost of aluminum that must be used in forming pipes or other tubular products.

This invention is shown in an illustrative embodiment in the accompanying drawing, in which—

Figure 1 is a diagrammatic flow sheet showing the production of tubular metallic foil products in accordance with this invention; and Fig. 2, a cross-sectional view taken on line 2—2 of Fig. 1, showing one of the tubular products in cross-section.

We have heretofore described an aluminum foil laminate and method of producing the same in our co-pending application Serial No. 462,010, filed October 13, 1954, now abandoned. The present application is a continuation-in-part of the cited co-pending application. The specific features of the present invention in some of its embodiments can best be understood by reference to the accompanying drawing.

Looking first at Fig. 1, there is illustrated a processing line for the production of various tubular aluminum foil products in accordance with this invention. Starting at the upper left-hand corner, an aluminum foil sheet 10 is conveyed past an adhesive applicator station, designated generally as 11, whereat an adhesive coating is applied to the upper surface thereof. A second sheet of aluminum foil 12 is applied to the adhesive-coated surface of foil sheet 10, the foil sheets 10 and 12 being passed between rollers 13 and 14. This produces an aluminum foil laminate 15 of the character described in our co-pending application Serial No. 462,010, cited above.

The aluminum foil laminate 15 is then fed to a winding machine 16, which can be a convolute or spiral tube winder. Since such machines are well known to the art, it is not believed that it will be necessary to describe the details of the operations of these machines in the present application. Within winder 16, the laminate foil 15 is formed into a tube 17 which may have one or more integral foil layers arranged spirally around the walls thereof, as indicated at 18. It will be understood that additional adhesive is applied to laminate 15 within winder 16 in the forming of tube 17, and that preferably the edges of the laminate foil sheet 15 will be made to overlap as they are wound spirally in the production of tube 18. If desired, the individual foil sheets, such as sheets 10 and 12, can be fed directly into winder 16 and formed into a multiple layer tube. Layers of foil can be built up on the tube in both directions by the use of multiple winders. Commercially available convolute and spiral tube winders are adapted to form a plurality of separate sheets into a single continuous tube, which can be cut to any desired length. The individual foil sheets or separate laminate foil sheets can be wrapped with either butt or lapp joints.

For some purposes, tube 17 is ready for use and can be passed directly to product storage or shipment at 19. However, when a thermo-setting resin adhesive has been employed for the production of laminate 15 and has the adhesive within winder 16, as preferred, it will usually be desirable to pass the foil laminate tube through a curing oven 20. In this way, the partially cured adhesive layers, which are in a flexible resilient state, can be cured to a state of increased rigidity, thereby reinforcing and strengthening the tubular product.

Figure 2 is a cross sectional view of tube 17. In this embodiment, the walls of the tube are formed from three foil layers 17a, 17b and 17c united by adhesive layers 17d and 17e.

For irrigation pipe and other applications, the tubular foil laminate 17 can be subjected to a forming operation at 21 to alter its cross-sectional shape or make some other change in its mechanical structure. Such a forming operation may also be adapted to increase the strength and rigidity of the tubular product.

After the completion of the forming operation, it is preferred to pass the pipe sections through the curing oven 20 before being passed to product storage or shipment at 19. Further details and variations of this invention will now be set forth.

Any thin, flexible metal foil can be used for the purpose of this invention, although aluminum foil is preferred. For example, stainless steel foil or titanium foil might be substituted for aluminum to increase the heat resistance of the laminate and for other purposes. The aluminum foil sheets can range in thickness from .00035 to .005 inch. The presence of so-called "pinholes" in the thin gauges of commercial aluminum foil does not present any particular problems when used in the present invention. The aluminum foil products will contain a plurality of layers of the aluminum foil with an adhesive layer between each of the adjacent aluminum foil layers. This construction gives considerable assurance that the walls of the tube will be substantially impervious to water even when considerable pressure is applied to the water. It is unlikely that the pinholes in the aluminum foil sheets will match up to provide direct escape passages through the tube walls, and the adhesive layers provide further barriers to the passage of liquids through the walls of the tubular products.

Various adhesive materials can be employed while still achieving some of the advantages of this invention. Generally, the adhesive should be selected for its capacity to form a strong bond with metals and particularly with aluminum. Suitable adhesives for some purposes include those falling within the classes of thermo-setting resin adhesives, thermoplastic resin adhesives, and elastomeric adhesives. The thermo-setting resin adhesives are preferred, and particularly the epoxy resin adhesives. Epoxy resin adhesives upon first application and when only partially cured are flexible and resilient, while being curable by the application of heat to a condition of increased rigidity. Moreover, such adhesives function as good bonding agents whether or not they are completely cured to a rigid, infusible condition. A wide range of properties can be achieved with regard to the product either in its final condition or for intermediate processing operations, as described above.

The epoxy resin adhesives can be applied in the form of liquids, solvent solutions, or for short periods of time as hot solutions (melts), or melted B-staged powders. The adhesive is shown being applied as a hot solution in Fig. 1 of the drawing. The two components of the adhesive are heated separately in tanks 31 and 32 and are passed to a small mixing vessel at 33 from which the hot mixture is applied to coating roll 34 and then on to the upper surface as it is pressed against the lower roll 35. When the adhesive is used in the form of a solvent solution, the components of the adhesive can be dissolved in a suitable solvent and this solution applied to the foil. If desired, the adhesive solution can be applied to one surface of a foil sheet and the solvent evaporated therefrom before the second sheet is applied to form a laminate, such as laminate 15, which is passed to winder 16.

The advantages of using epoxy resins include excellent adhesion to clean metal surfaces without complicated surface preparations. The hardening (or polymerization) mechanism is one of addition rather than condensation. This means that no by-products are formed to interrupt the long chain formations. These can be manifested in the formation of gaseous pockets. Pressure must be employed to prevent this in laminates using condensation polymerized products, while only a minimum or contact pressure is adequate to produce a good epoxide film. Another advantage of this mechanism is the low shrinkage factor that does not tend to distort the desired structural dimensions.

One particularly suitable adhesive consists of the reaction product of an epoxy resin and a polyamide. These components can be heated individually to a temperature of 90 to 100° C. to soften them, then mixed and applied. Reaction between the two components gives a cross-linked polymer having characteristics of hardness and flexibility and curing time which vary with the mixing proportions and temperature of curing. The epoxy resins and the polyamide components can be of the types described in our co-pending application Serial No. 462,010. Usually about a 50–50 mixture of epoxy resin and polyamide gives good results. These components can be dissolved in methylethyl ketone or toluene, xylene, or comparable solvents for application as solvent solutions. Among the commercially available epoxy resin adhesives which may be mentioned are the Epon adhesives VI and VII of Shell Chemical and the Araldite adhesives AN–101 and AN–104 of Ciba. However, the preferred adhesives for this invention are not limited to those prepared from the interaction of epoxy resins and polyamides. They may also be made by reacting epoxy resins with amine hardeners and cross-linking agents. These in the main are polyamines of various molecular weights as ethylenediamine, phenylenediamines, etc. Mixtures of polyamide and diamines can also be used.

Thermo-setting resin adhesives of the character described are quite desirable for applicant's purposes. However, as indicated, for some applications, thermo-setting resin adhesives or elastomeric adhesives might be used. Such adhesives are usually either flexible or rigid upon application, and lack the range of flexibility-hardness properties of epoxy resin adhesives. For example, rubber base adhesives remain flexible, while thermoplastic resin adhesives like polystyrene adhesives are rigid at normal temperatures, although softening on the application of heat. Further, such adhesives are normally unstable in the higher temperature regions, say in excess of 200° F. Some resins, however, such as the phenolic resins, are useful for increasing heat resistance and dimensional stability of the laminate products under heat. Epoxy resins containing amine hardeners have improved stability to heat, while those containing polyamides have better low temperature flexibility characteristics.

The preference for epoxy resin adhesives, as indicated above, is based in part on the range of properties obtainable with these adhesives. By combining the epoxy resin with the long-chain polyamides in various proportion, the flexibility of the adhesive can be changed over a considerable range. For example, a mixture of epoxy resin, like Epon 828 (Shell Chemical Company) with Polyamide 115 (General Mills) in approximately equal proportions yields an adhesive of good flexibility when applied and which remains flexible until heat-cured. The inclusion of low molecular weight hardeners, like ethylenediamine in amounts up to 10% by weight of the mixture, tends to reduce the flexibility of the adhesive. Additional modifying resins can also be included. These include such modifiers as elastomeric materials like Thiokol LP3 (American Cyanamid). Inert fillers may also be used for various purposes. Fillers like calcium carbonate, aluminum oxide, and aluminum powder increase the rigidity and decrease the shrinkage of the adhesive layer. The metal powder increases the heat transfer. Fillers like asbestos or glass fibers can be used. The asbestos fibers would increase the heat resistance, while the glass fibers would increase the strength of the adhesive layer. Other types of fillers or inner layers can also be used, such as resin impregnated cloth, paper, etc.

As indicated above, the adhesive formulation, especially in the case of thermo-setting resin adhesives like the epoxy resin adhesives can be employed as a means for varying the properties of the foil laminate or foil laminate tube. The properties of the foil laminate or the tube walls can also be varied by increasing or decreasing the thickness of the aluminum foil or by selecting foil which has been tempered to a different degree of hardness and flexibility. The thickness of the adhesive layers between the foil layers will also affect the properties. In general, the thicker the foil layer, the more rigid and less flexible will be the resulting material. Also, as already indicated, the difference between merely letting the adhesive set at ordinary temperatures and subjecting it to a heat-cure of greater or lesser duration can be taken advantage of to control the relative flexibility or rigidity of the resulting material.

As a specific example of the production of portable irrigation pipe by the method of this invention, the following can be set forth:

*Example*

Three sheets of .003 hard A1 aluminum foil were fed into a convolute winder of a standard commercial type and wrapped to form a multi-layered tube. The outer foil layers were coated with adhesive only on their inner sides, while the inner layer was coated on both sides. The lamination was at contact pressure and air cured at room temperature. Later it was heated at 300° F. for 10 minutes to achieve the optimum physical properties. The adhesive used was an epoxy resin adhesive prepared by mixing a solution in equal parts of General Mills Polyamide 115 with Shell Epon 1001. The weight of the tubing was under 5 pounds per 30 foot length. The product was suitable for use as portable irrigation pipe.

Portable irrigation pipe produced in accordance with this invention has the advantage of being relatively cool to handle even after being exposed to the sun for considerable periods of time. By having a highly polished outer layer of foil on the pipe laminate, the heat rays from the sun will be largely reflected, thus tending to keep the inner layers relatively cool. The plastic inner layer of adhesive material is also of value in this connection, since it has insulating properties and separates the heat-conductive foil layers. The lightness of the pipe is also an important advantage. For other applications, the layer of foil forming the inner diameter of the pipe can be made from very resistant alloys of aluminum, stainless steel, copper, titanium, or any other metallic foil providing a high degree of corrosion resistance to a particular liquid or gaseous medium which is to be conveyed through the pipe. Such corrosion-resistant metals are ordinarily relatively expensive. By this invention, the use of such expensive material can be reduced to a minimum, since it need only comprise the inner foil layer. In all applications, the plastic binder, which may be reinforced with fibers or pigments in various forms, serves the important functions of cementing or laminating the layers of foil, and at the same time strengthening the foil layers by filling in surface imperfections. The plastic layer also forms an excellent sealer and barrier to prevent liquid or vapor seepage between the laminar. This will impart resistance to galvanic action. In addition to functioning as an adhesive, the plastic layer, with or without fillers, will have good dielectric strength.

While in the foregoing specification this invention has been described in considerable detail in relation to specific embodiments thereof, it will be apparent to those skilled in the art that the invention is susceptible to other embodiments, and that many of the details described herein can be varied considerably without departing from the basic concepts of the invention. For example, the invention is not limited to the use of the production of portable aluminum pipe, but instead has many other applications. The tubular metal products produced in accordance with this invention may be used as disposable pipe liners for permanent piping installations. In shorter sections, the tubular products will be useful for containers, and generally for any application where aluminum foil tubes or extruded aluminum tubes are currently used.

We claim:

1. In a lightweight pipe, an elongated tube having walls consisting of layers of aluminum foil of a thickness in the range of .00035" to about .0005", with an epoxy resin adhesive layer between adjacent foil layers, said epoxy resin adhesive being distributed over said aluminum foil layers and bonding them together.

2. An elongated tube having walls consisting of at least two layers of aluminum foil, with a layer of epoxy resin adhesive between each foil layer, said epoxy resin adhesive being distributed over said foil layers and bonding them together, each of said two foil layers being composed of an integral sheet of aluminum foil having a thickness in the range of about .00035" to about .0005" and arranged spirally.

References Cited in the file of this patent

UNITED STATES PATENTS

| | | |
|---|---|---|
| 285,576 | Coas | Sept. 25, 1883 |
| 2,159,948 | Hatch | May 23, 1939 |
| 2,348,284 | Dunleavey | May 9, 1944 |
| 2,402,039 | Goldman | June 11, 1946 |
| 2,473,875 | Goldman | June 21, 1949 |
| 2,525,070 | Greenwald et al. | Oct. 10, 1950 |
| 2,623,681 | Wilcox | Dec. 30, 1952 |
| 2,637,674 | Stahl | May 5, 1953 |
| 2,642,412 | Newey | June 16, 1953 |
| 2,651,589 | Shokal | Sept. 8, 1953 |
| 2,798,510 | Martin | July 9, 1957 |
| 2,853,222 | Gallagher | Sept. 23, 1958 |

FOREIGN PATENTS

| | | |
|---|---|---|
| 399,304 | Great Britain | Oct. 5, 1933 |

OTHER REFERENCES

Publication, Product Engineering, July 1954, pp. 166–169–138–25. Copy in Div. 11.